US009342470B2

(12) United States Patent
Bryant-Rich et al.

(10) Patent No.: US 9,342,470 B2
(45) Date of Patent: *May 17, 2016

(54) SYSTEM FOR ENABLING SOFTWARE IN STORAGE-CAPABLE DEVICES

(71) Applicant: SanDisk IL Ltd., Kfar Saba (IL)

(72) Inventors: Donald Ray Bryant-Rich, West Carmel (IL); Judah Gamliel Hahn, Ofra (IL)

(73) Assignee: SanDisk Technologies Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/053,168

(22) Filed: Oct. 14, 2013

(65) Prior Publication Data

US 2014/0143794 A1 May 22, 2014

Related U.S. Application Data

(63) Continuation of application No. 12/173,828, filed on Jul. 16, 2008, now Pat. No. 8,561,087.

(51) Int. Cl.
| | |
|---|---|
| *G06F 21/51* | (2013.01) |
| *G06F 21/79* | (2013.01) |
| *G06F 13/10* | (2006.01) |
| *G06F 9/44* | (2006.01) |

(Continued)

(52) U.S. Cl.
CPC ............... *G06F 13/102* (2013.01); *G06F 8/61* (2013.01); *G06F 9/4411* (2013.01); *G06F 21/445* (2013.01); *G06F 21/51* (2013.01); *G06F 21/572* (2013.01); *G06F 21/79* (2013.01); *G06F 2221/2129* (2013.01)

(58) Field of Classification Search
CPC ... G06F 21/79; G06F 8/61; G06F 2221/2129; G06F 21/51; G06F 13/102; G06F 9/4411; G06F 21/445

See application file for complete search history.

(56) References Cited

U.S. PATENT DOCUMENTS

| 7,200,390 B1 | 4/2007 | Henager et al. |
| 8,561,087 B2 | 10/2013 | Bryant-Rich et al. |

(Continued)

OTHER PUBLICATIONS

Anonymous: "IEEE Standard Protocol for Authentication in Host Attachments of Transient Storage Devices; IEEE Std 1667-2006", IEEE Standard, Jun. 6, 2007 (58 pages).

(Continued)

*Primary Examiner* — Charles E Anya
(74) *Attorney, Agent, or Firm* — Brinks Gilson & Lione (57) ABSTRACT

Methods for enabling software from a storage-capable device including the steps of: loading, by a host system operationally connected to the storage-capable device, software from an authenticatable storage area residing in the storage-capable device; validating the software; and installing the validated software, wherein the validated software provides an interface between the host system and the storage-capable device. In some embodiments, the software is enabling software, the method further including the step of loading, by the host system, device-functionality software from the authenticatable storage area. In some embodiments, the method further includes the steps of: validating the device-functionality software; and enabling the validated device-functionality software. In some embodiments, the method further includes the steps of prior to the step of loading the software, executing a probe command in the host system; and returning, by the probe command, a list of device functional units residing in the storage-capable device.

19 Claims, 3 Drawing Sheets

(51) Int. Cl.
*G06F 21/44* (2013.01)
*G06F 21/57* (2013.01)
*G06F 9/445* (2006.01)

(56) References Cited

U.S. PATENT DOCUMENTS

| | | |
|---|---|---|
| 2002/0087876 A1 | 7/2002 | Larose |
| 2005/0193188 A1* | 9/2005 | Huang .............................. 713/1 |
| 2005/0216755 A1 | 9/2005 | Lipsky et al. |
| 2007/0043882 A1 | 2/2007 | Natarajan et al. |
| 2007/0061566 A1 | 3/2007 | Bailey et al. |
| 2007/0107067 A1 | 5/2007 | Fountian |
| 2008/0059743 A1 | 3/2008 | Bychkov et al. |
| 2008/0127225 A1 | 5/2008 | Mullis et al. |
| 2008/0162915 A1 | 7/2008 | Price et al. |
| 2009/0031403 A1 | 1/2009 | Huang |
| 2009/0228991 A1 | 9/2009 | Schneider et al. |
| 2009/0327634 A1 | 12/2009 | Bovee |
| 2009/0328196 A1 | 12/2009 | Bovee |

OTHER PUBLICATIONS

Donald Rich: "Authentication in Transient Storage Device Attachments", Computer, IEEE Service Center, Apr. 2007 (3 pages).
International Search Report issued in International App. No. PCT/US2009/050002, mailed on Nov. 18, 2009 (7 pages).
Written Opinion issued in International App. No. PCT/US2009/050002, mailed on Nov. 18, 2009 (9 pages).

* cited by examiner

SYSTEM FOR ENABLING SOFTWARE IN STORAGE-CAPABLE DEVICES

CROSS-REFERENCE TO RELATED APPLICATION

This application is a continuation of U.S. Application No. 12/173,828, filed Jul. 16, 2008, pending, the entirety of which is hereby incorporated herein by reference.

FIELD AND BACKGROUND OF THE INVENTION

Embodiments described herein relate to methods for providing an authenticatable storage area for installing or executing software in a storage-capable device.

The use of transient storage devices (TSDs) in both the private and corporate world has become ubiquitous. These devices provide similar functionality that floppy disks once did, but at much higher capacities and with greater reliability and functionality. While authentication was not previously required before a host system accessed a storage device, concern regarding data security and integrity has made this is an important issue.

Prior-art methods for enabling software include Plug-and-Play applications, Autorun mechanisms, device-driver installers, and operating-system (OS) updaters. However, most of the methods known in the art do not provide a robust and reliable security feature for controlling software installation or execution. Enterprises are now beginning to require authentication of devices before connection by a host system is permitted. No standard way of accomplishing that authentication exists for these devices.

It would be desirable to have methods for providing a authenticatable storage area for installing or executing software in a storage-capable device.

SUMMARY OF THE INVENTION

Embodiments described herein provide methods for providing an authenticatable storage area for installing or executing software in a storage-capable device.

It is noted that the host system referenced herein is capable of supporting the IEEE 1667-2006 standard (it is understood that various aspects of the present to disclosure may employ the IEEE 1667 Specification, IEEE 1667-2006, available at www.ieee.org/web/standards/home/index.html). The host system is able to identify the silos in the storage device operationally connected thereto and to support a method of loading the applications for the other silos in the storage device. Examples of host systems include PCs, PDAs, and mobile phones.

Additionally, the host system may be capable of communicating with a server. The server connection may be used to provide updates to the contents of a secure software silo (SSS). The host system need not be secure, but can securely decrypt the contents of the SSS, and validate the contents and the signatures of associated certificates. The term "certificate" is used herein to refer any type of security token or functional equivalent.

The term "storage-capable device" is used herein to refer to a device that provides storage that can be addressed by a host system, but is not permanently attached operationally to a specific host system. Examples of storage-capable devices include a TSD, a PDA, and a printer with on-board memory. While TSD is used in exemplary embodiments described herein as an example of a storage-capable device, it is understood that embodiments implementing methods described herein with other storage-capable devices are contemplated as well. The expression "loading software" is used herein to refer to the actions of both accessing software and updating software.

The terms "addressable command target" and "ACT" are used herein to refer to a uniquely addressable area in a storage device, to which commands can be routed based on the TSD's native communications protocol. The term "enabling software" (used herein both (1) as an expression of activating software, and (2) as a type of software) is used herein to refer, respectively, to (1) installing, executing, or otherwise configuring software (e.g. drivers) in order to be accessed, and (2) software (e.g. drivers) that enables other software to be installed, executed, or accessed. The term "device-functionality software" is used herein to refer to any software that provides a functionality to a TSD. Examples of such functionalities include but are not limited to security, compression, and storage back-up capabilities for a TSD.

The terms "device functional unit" and "DFU" are used herein to refer to a uniquely addressable receiver of commands. A silo (used herein in exemplary embodiments), as described in the IEEE 1667 standard, is an example of a DFU. As an example in accordance with using the IEEE 1667 standard, a silo may reside in an ACT; one or more silos may reside in a given ACT. The terms "authenticatable storage area" and "AST" refer to a silo that allows installation and execution of the software only upon proper software authentication. In exemplary embodiments described herein, an AST that is implemented within the framework of the IEEE 1667 standard is referred to as a "secure software silo" (SSS).

The terms "silo-type identifier" and "STID" are used herein to refer to a value uniquely identifying the function of a silo. The terms "probe silo" and "PS" are used herein to refer to a silo that is used to identify other silos in the TSD. The term "probe command" refers to a command that identifies (via an STID list, for example) the silo being mounted and/or the software associated with the silo. The terms "validation silo" and "VS" are used herein to refer to a silo that implements authentication of the agent that provides content to the DFU, and enables validation of the content upon retrieval. A validation silo may implement the authentication in a manner identical or similar to that implemented by the IEEE 1667 authentication silo (AS) as defined in the IEEE 1667-2006 standard. An SSS is a specific type of a VS.

Embodiments described herein relate to the trusted delivery of software and the activation of drivers to provide additional functionality specific to a storage device (e.g. UFD or SD card), beyond that which is provided in the base specification for such a storage-device class.

Embodiments described herein enable support responsibility of individual silo types to be shifted from the OS to the device/silo vendor through the use of the SSS, greatly simplifying the implementation of OS support for the 1667 standard. OS vendors are more likely to support the 1667 standard, if such support is simple, and less effort is required to develop such support.

Functionality developed for the SSS can be utilized by device/silo vendors. If the OS vendors support the SSS, new device functionality can be introduced in the form of new silo types without requiring direct support from the OS vendors. The only support required is the assignment of the applications supporting the new functionality.

In an embodiment described herein, the PS returns the SSS based on the host-OS identifier sent in the security-protocol-out payload of the probe command (see 1667 Conventions in the 1667 Specification). If the host OS does not support the applications in the SSS, then the applications are not returned in the security-protocol-in payload (i.e. the contents of the SSS are selected by the host-OS identifier). Thus, the host system will not load, validate, or install applications that are resident in the SSS, since their STIDs were not returned to the host system.

In another embodiment described herein, the SSS is configured with a list of silos supported by the software in the SSS. All silos are returned in the security-protocol-in payload. If the host OS does not support the applications of one or more listed silos, the host OS will ignore such silos. In another embodiment described herein, again, the SSS is configured with a list of silos supported by the software in the SSS. If the host OS does not support the applications in the SSS, the listed silos are not returned in the security-protocol-in payload.

In another embodiment described herein, more than one SSS can be present in an ACT. The host system selects the software to use based on a query to each silo for the supported host OS(s). The query returns the host-OS(s)-supported version(s) of the software, and/or the certificate of the software.

Therefore, according to embodiments described herein, there is provided for the first time a method for enabling software from a storage-capable device, the method including the steps of: (a) loading, by a host system operationally connected to the storage-capable device, software from an authenticatable storage area residing in the storage-capable device; (b) validating the software; and (c) installing the validated software, wherein the validated software provides an interface between the host system and the additional functionality of the storage-capable device.

In some embodiments, the software is enabling software, the method further including the step of: (d) loading, by the host system, device-functionality software from the authenticatable storage area.

In some embodiments, the method further includes the steps of (e) validating the device-functionality software; and (f) enabling the validated device-functionality software.

In some embodiments, the method further includes the steps of: (d) prior to the step of loading the software, executing a probe command in the host system; and (e) subsequent to the step of executing the probe command, returning, by the probe command, a list of device functional units residing in the storage-capable device.

In some embodiments, the host system is configured to access, from the list, only selected device functional units that are compatible with an operating system of the host system.

In some embodiments, the method further includes the steps of: (f) subsequent to the step of returning the list, returning the software based on a host-OS identifier sent in a security-protocol-out payload of the probe command; (g) determining whether an operating system of the host system supports the software; and (h) skipping the steps of loading, validating, and installing the software upon determining that the software is not supported by the operating system.

In some embodiments, the probe command is configured to return, from the list, only selected device functional units that are compatible with an operating system of the host system.

In some embodiments, the list is an STID list.

In some embodiments, the probe command is configured to return, from the list, only selected device functional units that are authorized for use with a specific host system.

In some embodiments, the probe command is configured to return, from the list, only selected device functional units that are dependent on a specific revision of a protocol used to enumerate the selected device functional units.

In some embodiments, the authenticatable storage area is a digital-rights management device functional unit.

In some embodiments, the step of validating the device-functionality software is performed using a signature.

In some embodiments, the method further includes the steps of: (d) prior to the step of loading the software, authenticating the authenticatable storage area to the host system using a device certificate; (e) subsequent to the step of authenticating, establishing a secure session between the host system and a server; and (f) subsequent to the step of establishing, sending an image of the software with a server certificate to the storage-capable device.

In some embodiments, the image is encrypted with a key agreed upon via a key exchange using the server certificate.

In some embodiments, the software is enabling software, the method further comprising the steps of: (g) validating the image; (h) loading, by the host system, device-functionality software from the authenticatable storage area; (i) validating the device-functionality software; and (j) enabling the validated device-functionality software.

In some embodiments, the step of validating the device-functionality software is performed using a signature in the device certificate.

According to embodiments described herein, there is provided for the first time a computer-readable storage medium having computer-readable code embodied therein for causing software to be enabled from a storage-capable device, the computer-readable code including: (a) program code for loading, by a host system operationally connected to the storage-capable device, software from an authenticatable storage area residing in the storage-capable device; (b) program code for validating the software; and (c) program code for installing the validated software, wherein the validated software provides an interface between the host system and the storage-capable device.

In some embodiments, the software is enabling software, the computer-readable code further includes: (d) program code for loading, by the host system, device-functionality software from the authenticatable storage area.

In some embodiments, the computer-readable code further includes: (e) program code for validating the device-functionality software; and (f) program code for enabling the validated device-functionality software.

In some embodiments, the computer-readable code further includes: (d) program code for, prior to the loading the software, executing a probe command in the host system; and (e) program code for, subsequent to the step of executing the probe command, returning, by the probe command, a list of device functional units residing in the storage-capable device.

In some embodiments, the host system is configured to access, from the list, only selected device functional units that are compatible with an operating system of the host system.

In some embodiments, the computer-readable code further includes: (f) program code for, subsequent to the step of returning the list, returning the software based on a host-OS identifier sent in a security-protocol-out payload of the probe command; (g) program code for, subsequent to the step of returning the software, determining whether an operating system of the host system supports the software; and (h) program code for, subsequent to the step of determining, skipping the steps of loading, validating, and installing the software upon determining that the software is not supported by the operating system.

In some embodiments, the probe command is configured to return, from the list, only selected device functional units that are compatible with an operating system of the host system.

In some embodiments, the list is an STID list.

In some embodiments, the probe command is configured to return, from the list, only selected device functional units that are authorized for use with a specific host system.

In some embodiments, the probe command is configured to return, from the list, only selected device functional units that are dependent on a specific revision of a protocol used to enumerate the selected device functional units.

In some embodiments, the authenticatable storage area is a digital-rights management device functional unit.

In some embodiments, the program code for validating the device-functionality software is operative using a signature.

In some embodiments, the computer-readable code further includes: (d) program code for authenticating the authenticatable storage area to the host system using a device certificate, prior to the loading of the software; (e) program code for establishing a secure session between the host system and a server subsequent to the authenticating; and (f) program code for sending an image of the software with a server certificate to the storage-capable device, subsequent to the establishing.

In some embodiments, the image is encrypted with a key agreed upon via a key exchange using the server certificate.

In some embodiments, the software is enabling software, the computer-readable code further includes: (g) program code for validating the image; (h) program code for loading, by the host system, device-functionality software from the authenticatable storage area; (i) program code for validating the device-functionality software; and (j) program code for enabling the validated device-functionality software.

In some embodiments, the program code for validating the device-functionality software is operative using a signature in the device certificate.

These and further embodiments will be apparent from the detailed description to and examples that follow.

BRIEF DESCRIPTION OF THE DRAWINGS

Embodiments are herein described, by way of example only, with reference to the accompanying drawings, wherein.

DESCRIPTION OF THE PREFERRED EMBODIMENTS

Embodiments described herein relate to methods for providing an authenticatable storage area for installing or executing software in a storage-capable device. The principles and operation for providing an authenticatable storage area, s according to embodiments described herein, may be better understood with reference to the accompanying description and the drawings.

According to an example embodiment, the secure software silo is an IEEE 1667 silo that implements the proposed AST specification. While it is assumed that the SSS contains a single application and a certificate, extension to multiple applications (and associated certificates) is possible (e.g. using indexing based on either STIDs or silo indices). An application consists of one or more executable packages (e.g. archive files) providing, for example: support for another silo, a device capability not fully supported by the host OS, a user application, other executable content, or silo specific data such as license certificates or configuration information.

If the executable package is an archive, the format of the archive can be selected based on the host OS as provided by the probe command (e.g. CAB for Windows or RPM for Red Hat Linux). The SSS may contain a "flat" file system, a hierarchical file system, or a storage area without a file system. The certificate associated with the SSS attests to the validity of the contents of the SSS (e.g. using a signature), and serves to create a "chain of trust" as will be explained with regard to FIG. 1.

Figure 1:
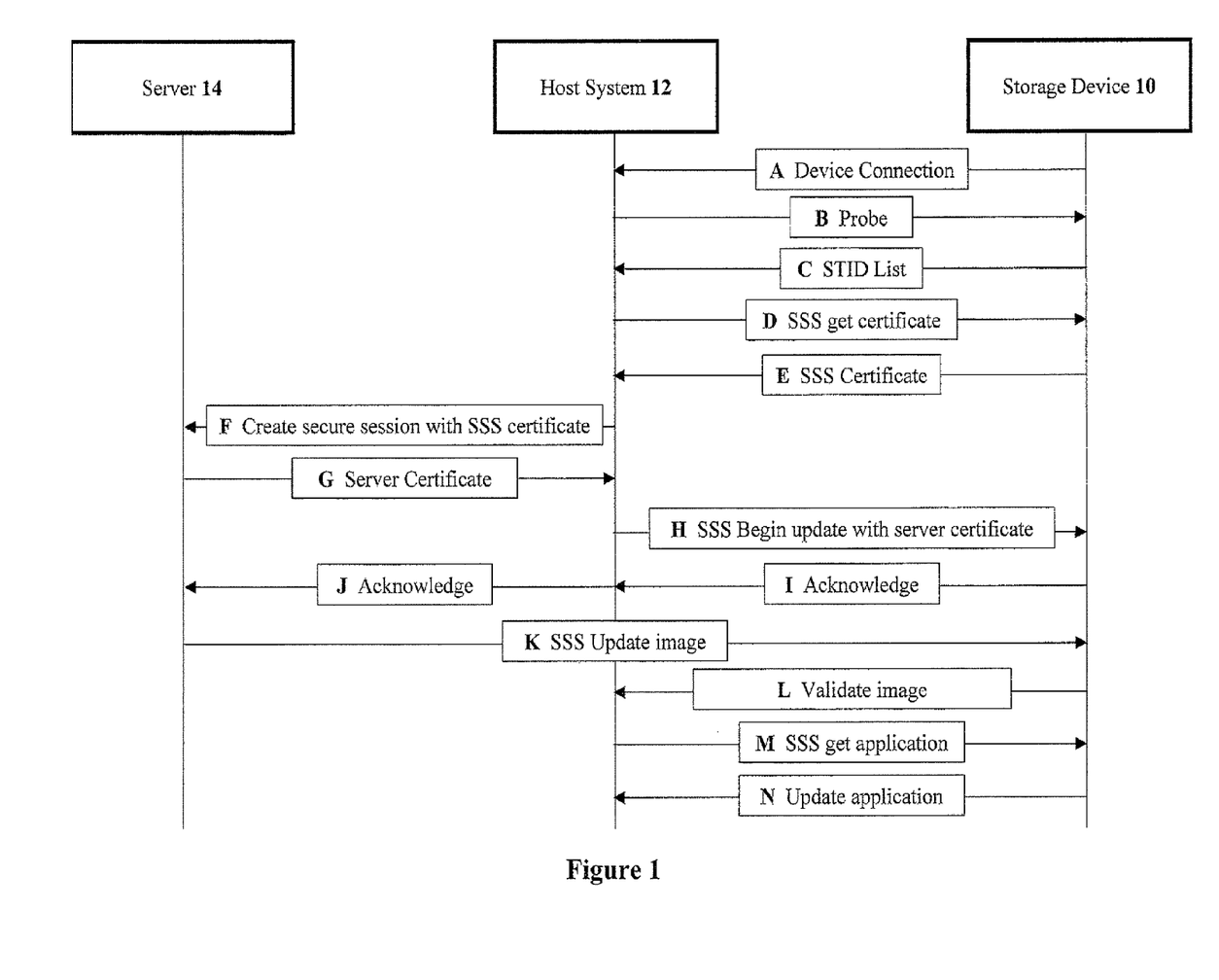
FIG. 1 is a simplified block diagram of the operational scheme for the implementation of a secure software silo, according to preferred embodiments described herein.

Referring now to the drawings, FIG. 1 is a simplified block diagram of the operational scheme for the implementation of a secure software silo, according to preferred embodiments described herein. The operational scheme of FIG. 1 relates to a write/update process. A similar scheme would apply to a read process as well. A storage device 10 (e.g. TSD) is first operationally connected to a host system 12 (Block A). Host system 12 is operationally connected to a server 14. Host system 12 then executes a probe command (e.g. 1667 probe command) (Block B). The probe command returns a list of DFUs (e.g. STID list) (Block C). The SSS then requests the necessary device certificate from host system 12 (Block D). Once the SSS receives the device certificate (Block E), host system 12 creates a secure session with server 14 using the device certificate (Block F).

Server 14 can, at its discretion, reject the session connection, or select specific software according to the provided device certificate, which would prevent unlicensed propagation of the software to other devices. Server 14 then provides a server certificate to host system 12, establishing the chain of trust (Block G). Server 14 encrypts the content image (i.e. image of the enabling software) with a key agreed upon via the key exchange (i.e. public-key exchange) using the server certificate and the device certificate.

The device certificate enables the association of the software in the SSS with storage device 10, preventing unlicensed propagation of the software to other devices. Coupling between the software loaded from the SSS and the specific unique instance of storage device 10 may be provided, if desired, by (1) signing the application using a device-specific public key such as that retrievable via the 1667 Authentication Silo manufacturer certificate (ASCm), (2) including the device serial number in a tamper-resistant manner, or (3) using an additional component such as a digital-rights management (DRM) DFU.

The SSS then begins to update its content image using the server certificate (Block H). Server 14 can, at its discretion, reject an update for specific software that is not considered trusted. For example, the device might reject Linux drivers signed with a Microsoft certificate, even though Microsoft Windows drivers are trusted from the same certificate. Acknowledgement of the update is sent from storage device 10 to host system 12 (Block I), and from host system 12 to server 14 (Block J). Server 14 then updates the content image of the SSS on storage device 10 (Block K). Content transfer to the SSS is atomic, meaning that if the update fails, then the SSS "rolls back" to the previous image.

Alternatively, instead of encrypting the software, once the device certificate is received, the software can be signed and then sent to storage device 10 without encryption, but with a signature that can be confirmed by storage device 10.

Once the update is complete, the content image is validated by storage device 10 (Block L). The SSS then retrieves the associated application via an application loader (Block M), and updates the application (Block N). The application loader uses the SSS commands to read the application and certificate from the SSS. The application contents are verified using a signature contained in the certificate, and the certificate itself is verified by the signature, creating a chain of trust to a certificate in an OS certificate store. The SSS can have a fixed or variable storage capacity for applications.

Verified and trusted applications (e.g. DRM applications) are installed for use by the OS of host system 12. These applications can be installed independent of the user privileges. The applications are removed when storage device 10 is removed, or when the OS shuts down.

More than one SSS can be provided to allow "locked" software (i.e. software locked to the device) and "unlocked" software to provide different levels of functionality. A bootstrap may also be stored in a partition (e.g. a compact disc (CD) partition) of storage device 10. Such a bootstrap could contain code required to support the PS and SSS interfaces in IEEE 1667 for host systems that do not natively support the IEEE 1667 protocol. The use of the SSS avoids the problem of updating a CD partition.

Furthermore, the use of the SSS eliminates the need to have a CD partition to protect the software associated with storage device 10. Applications do not need to be protected from deletion or modification by the user as the SSS is not visible to the user. Furthermore, the application does not need to be protected from modification by software, since any change will be rejected when the application is validated using the signature in the certificate. The certificate is itself validated and cannot be replaced due to the chain of trust required for application certificates.

An optional updater can be used to retrieve application updates from server 14 (as in Block H). The updater may be loaded from the SSS or the bootstrap. Server 14 is a source of updates for the applications stored in the SSS. To securely update the SSS, a secure session must be established with server 14 using the chain of trust. Server 14 for the SSS can be tied to the VS (e.g. AS in IEEE 1667 standard) or via a native interface in the SSS (depending on whether the VS is linked to the SSS).

Optionally, the updater requires certificates signed by the same signer of the device certificate in the SSS, in order to prevent installation of software from any other source. Optionally, the updater requires certificates signed by the same signer as a provisioning certificate in a VS associated with the same DFU.

Optionally, the SSS may contain multiple locations. For example, one location can require a certificate signed by the signer of a manufacturer certificate (ASCm), another location can require a certificate signed by the signer of an VS provisioning certificate (XCp), and another location can require a certificate signed by the signer of an VS host certificate used to authenticate host system 12 (HCh). As will be understood by one of ordinary skill in the art, other sets of multiple locations may be implemented in the SSS.

Figure 2:
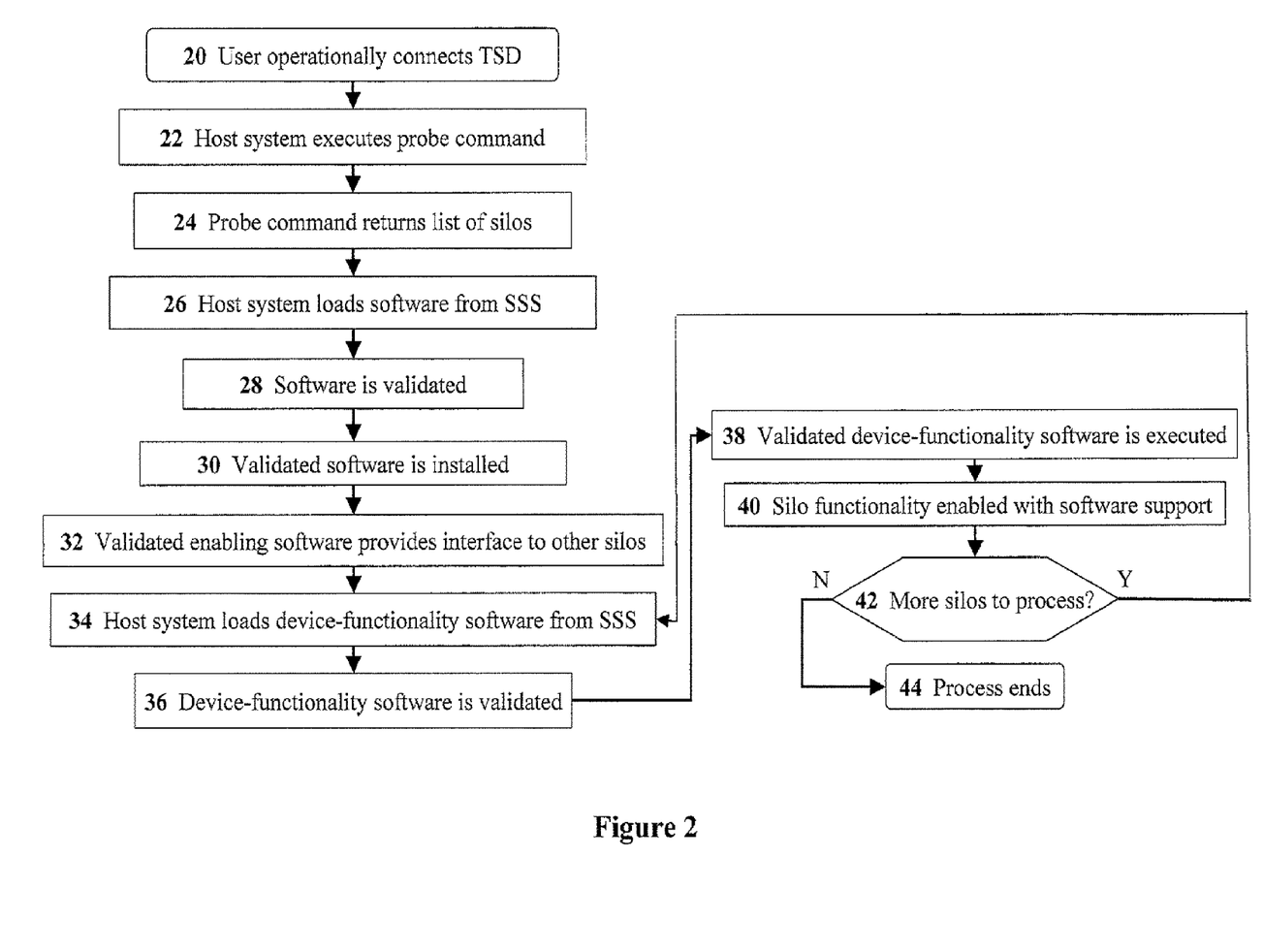
FIG. 2 is a simplified flowchart of the process steps for enabling software functionality via a secure software silo, according to preferred embodiments described herein.

FIG. 2 is a simplified flowchart of the process steps for enabling software functionality via a secure software silo, according to preferred embodiments described herein. FIG. 2 differs from FIG. 1 in part in that FIG. 2 shows how the software functionality is enabled through the SSS without showing the certification procedure through the server. As mentioned above with regard to FIG. 1, FIG. 2 relates to a write/update process. A similar scheme would apply to a read process as well. The process starts with a TSD being operationally connected to a host system (Step 20). The host system executes a probe command (Step 22). The probe command then returns the list of silos present (Step 24). The silos are functional units implemented in the storage device including the SSS.

The host system loads the software from the SSS (Step 26). The software is then validated (Step 28) and installed (Step 30). The validated software may then provide an interface to silos in the storage device (Step 32). The interface enables the device-functionality software to be loaded. The host system then loads the device-functionality software from the SSS (Step 34), and the device-functionality software is validated (Step 36). Validation is generally performed using secret codes carried by the device.

Once validated, the device-functionality software is executed (Step 38), and the silo functionality is enabled with software support (Step 40). The host system then checks whether there are more silos to process (Step 42). If there are more silos to process, then the host system loads additional software from the SSS (Step 32), and continues the process. If there are no more silos to process, then the process ends (Step 44).

The presence of the SSS minimizes the support required from the OS to just the probe command and the SSS commands. Even authentication can be performed by an application loaded from the SSS. The probe command, which identifies the host OS and version, may be used to provide support for more than one OS. This step can be performed in the PS, the host system, or the SSS.

The PS can be configured to return a list of only silos for which applications usable with the host OS reside in the SSS. This can be performed by providing a single silo that shows different content depending on the host OS. If the probe command returns more than one SSS, the host system can choose the silo containing the application most compatible with the host OS. This can be performed by allocating different STIDs for the SSS for each host OS (e.g. Windows SSS or Mac OS SSS), or by implementing a command on the SSS that returns host-OS compatibility to the probe command.

The SSS can also have a command that returns a list of compatible host-OS identifiers. Alternatively, such an identifier-list command can be included in the device certificate. In the case that the host OS is identified to the SSS, the SSS can return a list of applications specific to the host OS. If such applications do not exist, a failure notification can be returned.

The SSS can also be implemented with multiple host-OS-specific storage areas. In the case that the host OS is identified to the SSS, the SSS selects the storage area specific to the host OS. If such a storage area does not exist, a failure notification can be returned.

Figure 3:
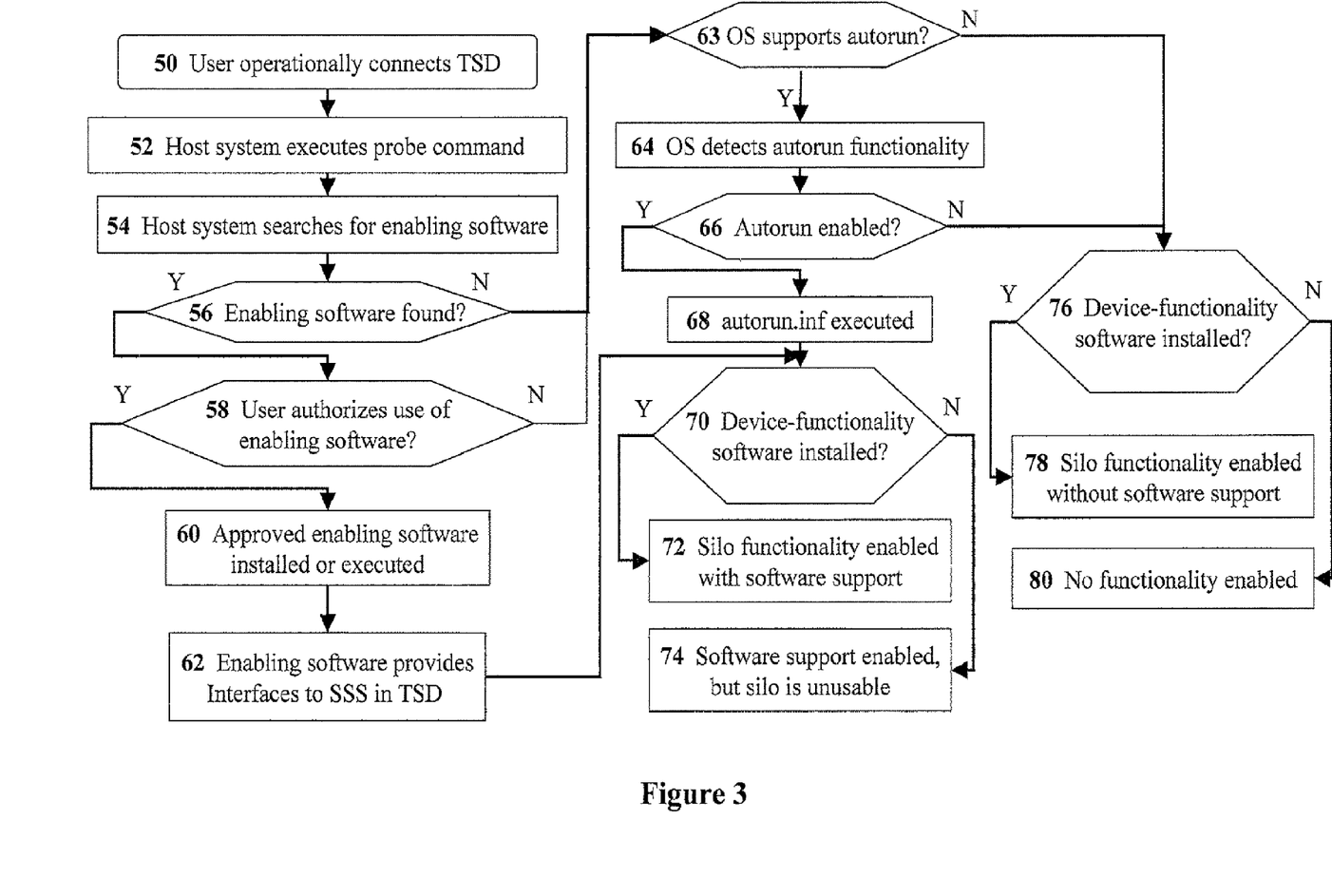
FIG. 3 is a simplified flowchart of the process steps for various scenario outcomes in the implementation of a secure software silo, according to preferred embodiments described herein.

FIG. 3 is a simplified flowchart of the process steps for various scenarios or outcomes in the implementation of a secure software silo, according to preferred embodiments described herein. The process starts with a TSD being operationally connected to a host system (Step 50). The host system executes a probe command (Step 52). The host system then searches for enabling software (Step 54). The host system checks whether enabling software was found (Step 56). If enabling software was found, the host system checks whether the user authorizes the use of the enabling software (Step 58). If the user authorizes the use of the enabling software, then the approved enabling software is installed or executed (Step 60). The enabling software provides interfaces to the SSS in the TSD (Step 70).

If no enabling software is found in Step 56, or the user does not authorize the use of the enabling software in Step 58, the process continues with Step 63. If the user is running an operating system such as Windows that supports autorun functionality, the OS may then detect the autorun functionality as specified in a user-accessible file such as autorun.inf (Step 64), and checks whether Autorun is enabled (Step 66).

If Autorun is enabled, then the autorun functionality is executed (Step 68). The host system then checks whether the device-functionality software is installed (Step 70). If the device-functionality software is installed, then silo functionality is enabled with software support (Step 72). If the device-functionality software is not installed, then software support is enabled, but the silo is unusable (Step 74).

If autorun is not available or enabled in Step 66, then the host system checks whether the device-functionality software is installed (Step 76). If the device-functionality software is installed, then silo functionality is enabled without software support (Step 78). If the device-functionality software is not installed, then no functionality is enabled (Step 80).

The initiation of the application stored in the SSS is performed by the IEEE 1667 support of the host OS independently of the Autorun mechanism. Host systems with the Autorun mechanism and full 1667 support can still provide full functionality even when the Autorun mechanism is disabled.

Prior-art methods for installation of device-specific applications or drivers are limited by the trust placed in the user as indicated by the user's privileges. This prevents the use of new devices or new device functionality until a limited-privileges user can have a higher-privilege user install the required applications or drivers. The SSS allows the removal of such privilege restrictions by providing a basis of trust that depends on the provider of the applications or drivers, independent of the user privileges. As an example, the Windows Update process utilizes a similar approach to provide temporary device-specific updates to the OS.

If the SSS is only visible when the TSD has been authenticated by a specific host system, un-authenticated host systems will see a different SSS that has support only for reduced functionality. The full functionality of the TSD cannot be ascertained by a host system that has not been authenticated, since even the interface required to access the functionality is stored in an inaccessible SSS, and such interfaces can differ from device to device.

While the invention has been described with respect to a limited number of embodiments, it will be appreciated that many variations, modifications, and other applications of the invention may be made. The invention is not limited except by the scope of the appended claims.

What is claimed is:

1. A host system, operable with software stored on a storage-capable device in communication with the host system, comprising:
   a host; and
   a storage-capable device interface for communicating with and for allowing the host to execute software stored on the storage-capable device, wherein the host is configured to cause the host system to:
   execute a probe command;
   in connection with the probe command, receive a list of device functional units residing in the storage-capable device;
   load, from an authenticable storage area residing in the storage-capable device, software based on an identifier sent in the probe command;
   validate said software; and
   install the validated software, wherein the validated software provides an interface between the host system and device-functional software in the storage-capable device;
   wherein the host system is further configured to determine whether an operating system of the host system supports the software and, in response to determining that the software is not supported by the operating system, skip the steps to load, validate and install the software.

2. The host system of claim 1, wherein the host system comprises a PC, a PDA or a mobile phone.

3. The host system of claim 1, the host system being further configured to access, from the list, only selected device functional units that are compatible with an operating system of the host system.

4. The host system of claim 1, wherein the probe command is configured to return, from the list, only selected device functional units that are compatible with an operating system of said host system, and the identifier is a host-OS identifier sent in a security-protocol-out payload of the probe command.

5. The host system of claim 4, wherein the list is a silo-type identifier list, and wherein the host system is further configured to skip the steps to load, validate, and install the software responsive to determining that the software is not supported by the operating system.

6. The host system of claim 1, wherein the probe command is configured to return, from the list, only selected device functional units that are authorized for use with a specific host system.

7. The host system of claim 1, wherein the probe command is configured to return, from the list, only selected device functional units.

8. The host system of claim 1, wherein the authenticable storage area is a digital-rights management device functional unit.

9. The host system of claim 1, wherein the host system is further configured to use a signature to validate the device-functionality software.

10. The host system of claim 1, wherein the storage-capable device is removable from the host system.

11. A host system, operable with software stored on a storage-capable device in communication with the host system, comprising:
   a host; and
   a storage-capable device interface for communicating with and for allowing the host to execute software stored on the storage-capable device, wherein the host is configured to cause the host system to:
   execute a probe command;
   in connection with the probe command, receive a list of device functional units residing in the storage-capable device;
   load, from an authenticable storage area residing in the storage-capable device, software based on an identifier sent in the probe command;
   validate said software; and
   install the validated software, wherein the validated software provides an interface between the host system and device-functional software in the storage-capable device;
   wherein the host system is further configured to determine whether an operating system of the host system supports the software; and
   wherein the host system is further configured to:
   prior to loading the software, authenticate the authenticable storage area to the host system using a device certificate;
   subsequent to authenticating, establish a secure session between the host system and a server; and subsequent to establishing the secure session, send an image of the software with a server certificate to the storage-capable device.

12. The host system of claim 11, wherein the host system is further configured to encrypt the image with a key agreed upon via a key exchange using the server certificate.

13. The host system of claim 11, wherein the software is enabling software and the host system is further configured to:
- validate the image;
- load device-functionality software from the authenticable storage area;
- validate the device-functionality software; and
- enable the validated device-functionality software.

14. The host system of claim 13, wherein the host system is further configured to use a signature in the device certificate to validate the device-functionality software.

15. A host system operable with software stored on a storage-capable device in communication with the host system, the host system comprising:
- a host; and
- a storage-capable device interface for communicating with and for allowing the host to execute software stored on the storage-capable device, wherein the host is configured to cause the host system to:
  - load software from an authenticable storage area residing in the removable storage-capable device;
  - validate the software;
  - install the validated software, wherein the validated software provides an interface between the host system and device-functionality software in the storage-capable device;
  - use the validated and installed software to load device-functionality software from the authenticable storage area;
  - validate the device-functionality software;
  - enable the validated device-functionality software;
  - prior to loading the software, authenticate the authenticable storage area to the host system using a device certificate;
  - subsequent to authenticating the authenticable storage area, establish a secure session between the host system and a server; and
  - subsequent to establishing the secure session, send an image of the software with a server certificate to the storage-capable device.

16. The host system of claim 15, wherein the host system is configured to encrypt the image with a key agreed upon via a key exchange using the server certificate.

17. The host system of claim 16, wherein the host system is configured to validate the device-functionality software using a signature in the device certificate.

18. The host system of claim 15, wherein the host system comprises a PC, a PDA or a mobile phone.

19. The host system of claim 18, wherein the storage capable device comprises a PDA or a printer.

* * * * *